US012106133B2

(12) United States Patent
Sahita et al.

(10) Patent No.: US 12,106,133 B2
(45) Date of Patent: Oct. 1, 2024

(54) METHOD AND APPARATUS FOR TRUSTED DEVICES USING TRUST DOMAIN EXTENSIONS

(71) Applicant: Intel Corporation, Santa Clara, CA (US)

(72) Inventors: Ravi Sahita, Portland, OR (US); Vedvyas Shanbhogue, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 811 days.

(21) Appl. No.: 17/095,119

(22) Filed: Nov. 11, 2020

(65) Prior Publication Data

US 2021/0141658 A1    May 13, 2021

(51) Int. Cl.
*G06F 9/455*    (2018.01)
*G06F 9/445*    (2018.01)
(Continued)

(52) U.S. Cl.
CPC .......... *G06F 9/45558* (2013.01); *G06F 9/445* (2013.01); *H04L 9/3263* (2013.01); *H04L 63/0428* (2013.01); *H04L 63/08* (2013.01); *G06F 2009/45583* (2013.01); *G06F 2009/45587* (2013.01)

(58) Field of Classification Search
CPC .................. G06F 9/45558; G06F 9/445; G06F 2009/45583; G06F 2009/45587; G06F 9/4411; G06F 2009/45579; G06F 2221/2129; G06F 21/44; G06F 21/577; H04L 9/3263; H04L 63/0428; H04L 63/08; H04L 9/3271; H04L 9/3265
See application file for complete search history.

(56) References Cited

U.S. PATENT DOCUMENTS 8,397,306 B1 * 3/2013 Tormasov ............... G06F 21/00
                                                  713/166
10,824,715 B2 * 11/2020 Mooring ................. G06F 21/53
(Continued)

OTHER PUBLICATIONS

International Search Report and Written Opinion for PCT Patent Application No. PCT/US21/51372, Mailed Jan. 5, 2022, 11 pages.

*Primary Examiner* — Kenneth Tang
(74) *Attorney, Agent, or Firm* — Compass IP Law PC (57) ABSTRACT

Methods and apparatus for trusted devices using trust domain extensions. The method is implemented on a compute platform including one or more devices and a set of hardware, firmware, and software components associated with a trusted computing base (TCB), including a host operating system and virtual machine manager (VMM). A device trust domain (dTD) is implemented in a trusted address space that is separate from the TCB, and one or multiple of the devices are bound to the dTD, which enables one or more virtual machines (VMs) or trusted domains (TDs) to access one or more functions provided by the bound device(s) in a secure and trusted manner. Firmware from a device is onloaded to the dTD and executed in the trusted address space to facilitate secure access to functions provided by the bound devices without using the VMM. Moreover, the VMM and any other software in the TCB cannot access data such as cryptographic keys and secrets that are employed by the dTD.

20 Claims, 4 Drawing Sheets

(51) Int. Cl.
*H04L 9/32* (2006.01)
*H04L 9/40* (2022.01)

(56) References Cited

U.S. PATENT DOCUMENTS

| | | | | |
|---|---|---|---|---|
| 2010/0281273 | A1* | 11/2010 | Lee | F04B 33/00 |
| | | | | 713/193 |
| 2011/0060947 | A1* | 3/2011 | Song | G06F 21/53 |
| | | | | 718/1 |
| 2013/0031374 | A1* | 1/2013 | Thom | G06F 21/74 |
| | | | | 713/189 |
| 2017/0177854 | A1* | 6/2017 | Gligor | G06F 21/44 |
| 2017/0185776 | A1* | 6/2017 | Robinson | G06F 21/575 |
| 2017/0286278 | A1* | 10/2017 | Thomas | G06F 21/52 |
| 2018/0114012 | A1* | 4/2018 | Sood | G06F 21/79 |
| 2018/0114013 | A1* | 4/2018 | Sood | G06F 21/606 |
| 2018/0247082 | A1* | 8/2018 | Durham | G06F 21/53 |
| 2019/0042463 | A1* | 2/2019 | Shanbhogue | G06F 9/30145 |
| 2019/0087575 | A1* | 3/2019 | Sahita | G06F 21/79 |
| 2019/0087587 | A1* | 3/2019 | Li | G06F 3/0623 |
| 2019/0147192 | A1* | 5/2019 | Khosravi | G06F 21/575 |
| | | | | 713/192 |
| 2019/0155728 | A1* | 5/2019 | Ferguson | G06F 21/6209 |
| 2019/0220625 | A1* | 7/2019 | Durham | G06F 8/63 |
| 2019/0228145 | A1* | 7/2019 | Shanbhogue | G06F 3/0673 |
| 2019/0311123 | A1* | 10/2019 | Lal | H04L 9/321 |
| 2020/0050364 | A1* | 2/2020 | Gilbert | G06F 9/45558 |
| 2020/0145419 | A1 | 5/2020 | Yitbarek et al. | |
| 2020/0202013 | A1* | 6/2020 | Caspi | G06F 12/1441 |
| 2021/0026785 | A1* | 1/2021 | Wei | G06F 21/54 |
| 2021/0141658 | A1* | 5/2021 | Sahita | G06F 21/44 |
| 2022/0035904 | A1* | 2/2022 | Bursell | H04L 63/10 |

\* cited by examiner

METHOD AND APPARATUS FOR TRUSTED DEVICES USING TRUST DOMAIN EXTENSIONS

Traditionally, devices have added functionality over time, such as adding acceleration for data transformation, offloading functionality from the CPU (central processing unit) to the device, etc. This process also adds complexity to the device in order to preserve performance and security. Examples of such an evolution can be seen in devices such as network controllers, storage controllers, FPGAs (field programmable gate arrays), and graphics devices. Today's devices also need to be efficiently shared for multi-tenant usages such as cloud, virtualization, containers etc. This multi-tenancy requirements are also enforced via specialized engines on the devices to enforce separation of privileges, data path and secure arbitration. Examples of this evolution are observed in virtualized IO from direct device assignment (DDA), SR-IOV (Single-root Input-Output Virtualization) and SIOV (Scalable IO Virtualization).

TDX or Trust Domain Extensions are instructions in a CPU instruction set architecture (ISA) to remove a virtual machine monitor (VMM) from the trusted computing base (TCB) of cloud-computing virtual machine (VM) workloads (called Trust Domains or TDs). Generally, a TCB comprises a set of hardware, firmware, and software components that are implemented on a platform to provide a secure environment including a portion of the platform's memory address space that is used by the TCB. TDX IO extends that architecture to allow a VMM outside the TCB to manage devices that can be securely assigned to a TD. TDX IO enables a device to be securely assigned to the TD such that the data on the link is protected against confidentiality, integrity and replay attacks. TDX IO also enforces IOMMU (IO memory management unit) properties such that a device can use direct memory access (DMA) directly to a TD's private memory if the TD accepted an interface for a measured device.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified.

DETAILED DESCRIPTION

Embodiments of methods and apparatus for trusted devices using trust domain extensions (TDX) are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

In accordance with aspects of the embodiments disclosed herein, extensible methods and apparatus to extend the capabilities of a device via software that is executed with memory confidentiality, integrity and replay protection are provided. This approach enables reduction of the development and validation cost of the device by onloading critical security operations to a device-Trust Domain (dTD). Embodiments of the method may be implemented to build scalable devices by onloading firmware functionality to a dTD that executes without the VMM in the TCB, and binds to one or more hardware devices. The identity of the composed device is reported as a unit to other TDs and VMs on the platform.

The methods and apparatus enable device vendors to use the principles and techniques described herein to provide highly efficient in-line acceleration for multi-tenant devices via dTDs. The dTD can also efficiently support methods of sharing a device by mediation of data streams across untrusted tenants that use the device (via the dTD). Device operations can be accelerated by enabling firmware to use CPU ISA extensions (such as AVX, AMX, etc.) and build hybrid software/hardware (SW/HW) interfaces that support efficient use of hardware. This approach also allows for agile access-control models to be built for the device without complex firmware changes on the device. The approach also enables composability for multiple devices using a dTD.

Figure 1:
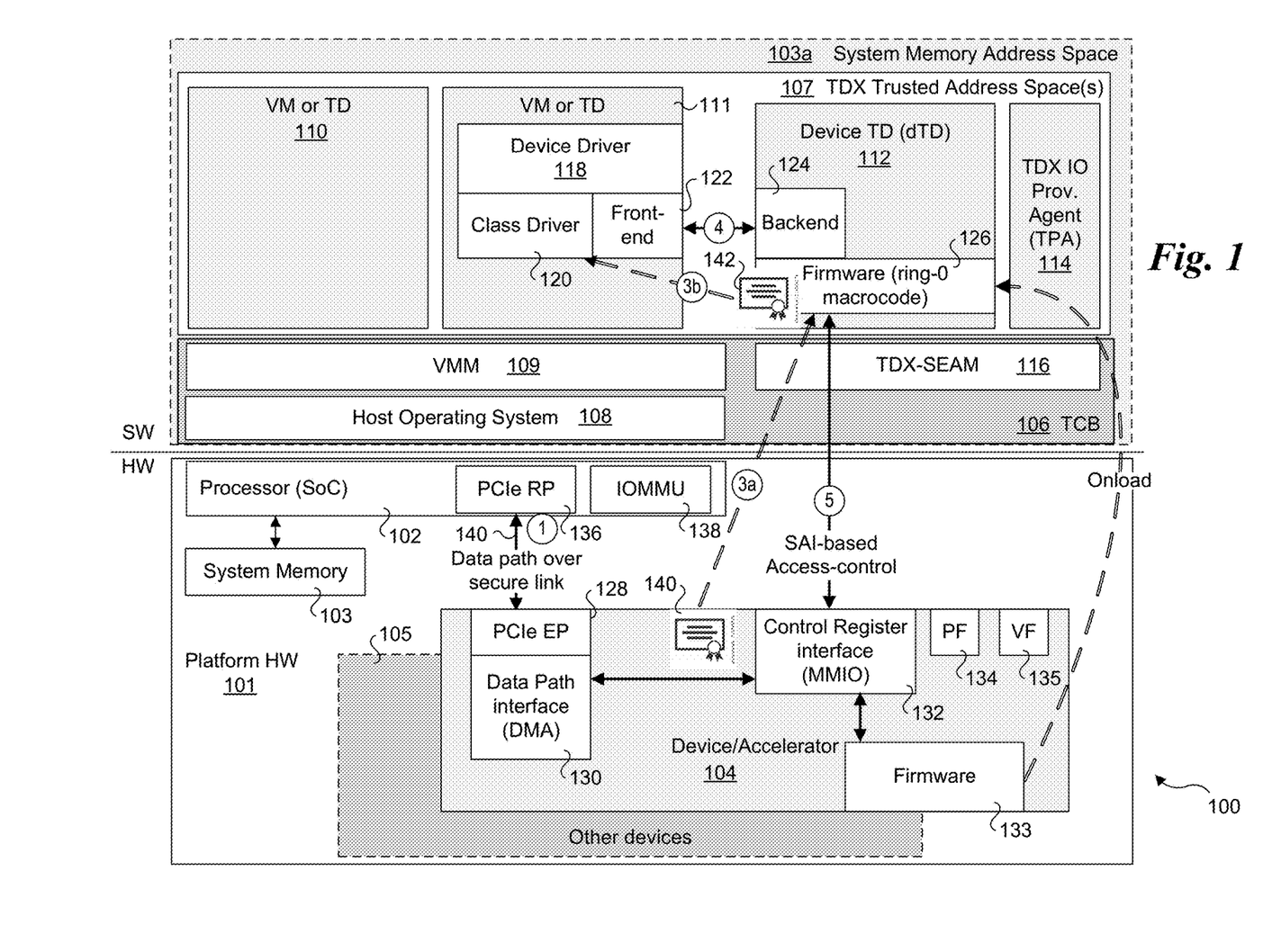
FIG. 1 is a schematic diagram of an architecture for implementing trusted devices with trust domain extensions, according to one embodiment.

FIG. 1 shows an architecture 100 for implementing trusted devices with trust domain extensions, according to one embodiment. Architecture 100 includes a hardware layer HW and a software layer SW. The hardware layer comprises platform hardware 101, which includes a processor 102 (also referred to as a CPU (central processing unit)), system memory 103, a device/accelerator 104, and one or more optional other devices 105. The system memory is depicted as a system memory address space 103a in which various software components implemented in the software layer are loaded and executed. The system memory address space 103a includes one or more memory regions that are part of a trusted computing base (TCB) 106 and (a) separate TDX trusted address space(s) 107. Each Trust Domain in TDX operates in its own trusted address space, which may be implemented using a private ephemeral key-based encrypted memory (that is integrity and replay-protected) or memory isolation (and a combination thereof).

In architecture 100, the illustrated software components include a host operating system (OS) 108, a VMM 109 hosting one of more VM or TDs, as depicted by a VM or TD 110 and a VM or TD 111, a device TD (dTD) 112, a TDX IO provisioning agent (TPA) 114, and a TDX-Secure Arbitration Mode (SEAM) module 116. VM or TD 111 includes a device driver 118, a class driver 120, and a frontend 122. Device TD 112 includes a backend 124 coupled (via a software interface) to frontend 122 and firmware 126 that is onloaded from device/accelerator 104 as described in further detail below.

Figure 4:
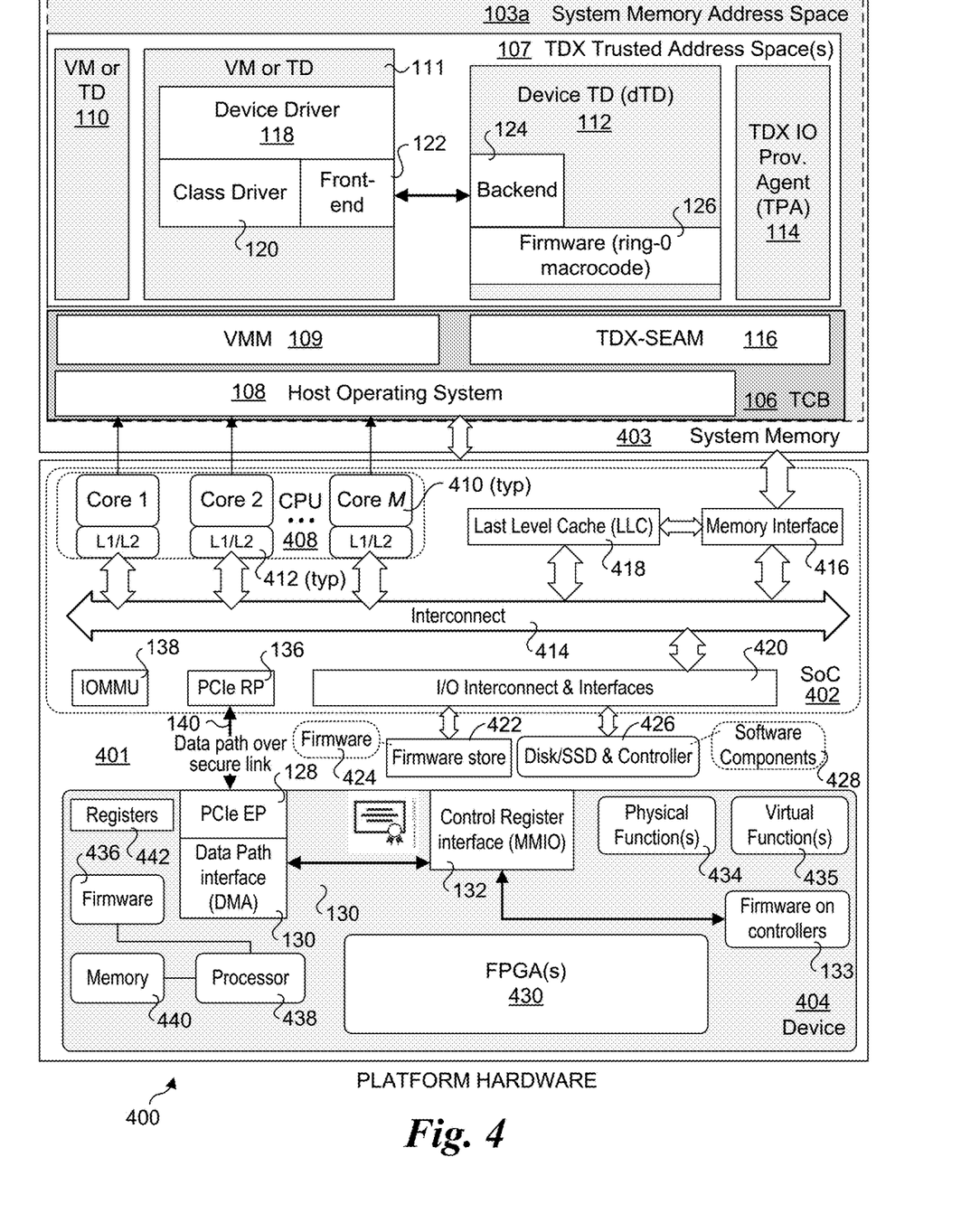
FIG. 4 is a schematic diagram of a platform architecture configured to implement aspects of the architecture shown in FIG. 1, according to one embodiment.

Device/accelerator 104 is illustrative of a device that may be implemented as a trusted device under the embodiments herein. In one embodiment device/accelerator 104 is an accelerator, but this is merely exemplary, as other types of devices may be used, including but not limited to network interfaces/adaptors, e.g. GPU, FPGA, IPU. Device/accelerator 104 includes a Peripheral Component Interconnect Express (PCIe) endpoint (EP) 128 coupled to a data path interface 130, a control register interface 132 and firmware 133. In one embodiment data path interface 130 comprises a Direct Memory Access (DMA) data path interface. Device/accelerator 104 also includes one or more physical functions (PFs) 134 and one or more virtual functions (VFs) 135. Further details of a device/accelerator are illustrated in FIG. 4 and discussed below.

In the illustrated embodiment, processor 102 employs and System on a Chip (SoC) architecture including a PCIe Root Port (RP) 136 and an Input-Output Memory Management Unit (IOMMU) 138. PCI RP 136 is coupled to PCI endpoint 128 via a secure PCIe link 140. IOMMU and data path interface 128 enable device/accelerator 104 to directly access memory in one or more memory address spaces in system memory on a host platform including processor 102 without employing software executing on processor 102. For example, this enables device/accelerator 114 to employ PCIe DMA data transactions to write to and read from memory allocated for device TD 108. In addition, in the illustrated embodiment control register interface 132 is implemented as Memory-Mapped Input-Output (MMIO), enabling software executing on processor 102 (such as dTD 112 and TPA 114) to directly access control registers on device/accelerator 114 using MMIO.

Under architecture 100, a dTD comprises a software entity that is bound to a physical device (e.g., device accelerator 104) that is composes into a virtual trusted device including a composed identifier (ID) of the device that is exposed to a consumer of the trusted device, such as a VM or TD operating in the TDX trusted address space. In one embodiment, the composed ID contains attestation information such as a measurement of the firmware loaded from the physical device (e.g., firmware 124 for device/accelerator 104) in combination with firmware on the physical device that is used to verify authentication of the composed virtual trusted device. Generally, the composed ID is a trusted identifier for the composed device.

The dTD further employs backend 124 as an interface to expose access to the trusted device including providing the composed ID and attestation information. Notably, the dTD executes without the VMM in the TCB (e.g., without VMM 109 in TCB 106) and thus data in the trusted address space cannot be accessed by the VMM or any software that employs the VMM, nor can be accessed by any software in the TCB without interfacing with the dTD. This provides of means of isolating access to trusted devices on a platform that is hosted by a third party, such as AWS.

Once a VM or TD accepts a dTD as a device it would like to use, a data path over a secure link is set up to support communication between the physical device bound to the dTD and that VM or TD, as depicted by secure link 140. Unlike virtualized environments employing a VMM, this secure data path bypasses the VMM (e.g., VMM 109). When a PCIe or CXL (Compute Express Link) is used for the secure data path, communication between the bound device and the VM or TD may employ DMA PCIe transactions. Some communication between the bound device and the VM or TD accessing the bound device as a composed trusted device may employ the dTD bound to the device.

Figure 2:
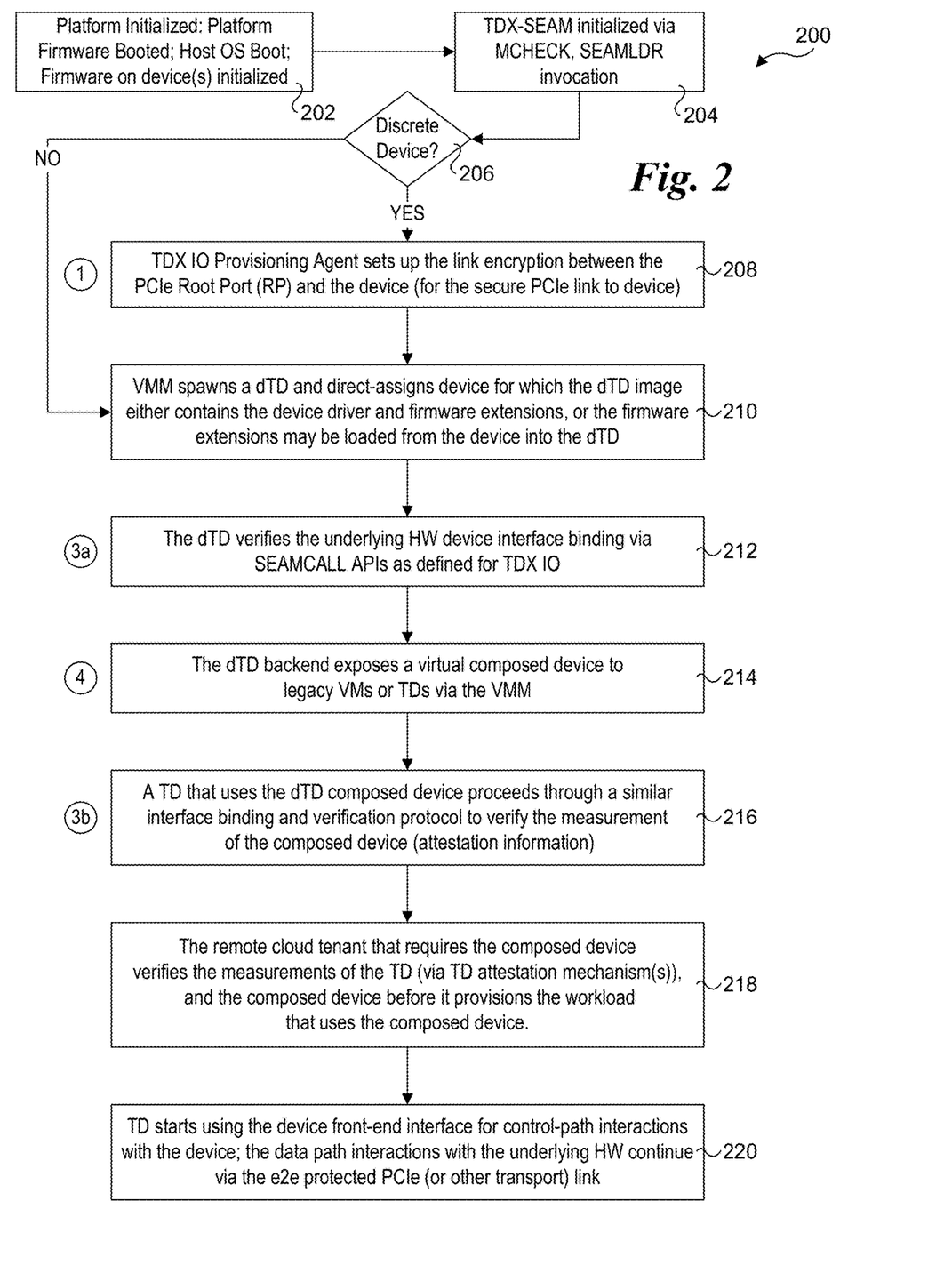
FIG. 2 is a flowchart illustrating operations to initialize and configure components in the architecture of FIG. 1 to enable access to trusted devices, according to one embodiment.

With further reference to a flowchart 200 in FIG. 2, architecture 100 is configured and operated in the following manner, according to one embodiment. First, as depicted in a block 202, the platform is initialized. This includes booting the platform firmware, following by booting a host operating system (OS) (e.g., host OS 108). Each device to be implemented as a trusted device (e.g., device/accelerator 104) is also initialized, which includes authentication and initialization of firmware on the device. Following initialization of the platform, in a block 204 TDX-SEAM 116 is initialized via a memory check (MCHECK) and SEAM loader (SEAMLDR) invocation. The TDX SEAM implements a secure arbitration mode of the processor/CPU that prevents the VMM from accessing any of the secrets of the TD or otherwise prevents any software in TCB 106 from accessing secrets held by any software components in TDX trusted address space 107 such as cryptographic keys, certificates, etc.

The remaining operations shown in flowchart 200 are performed for each device that is to be implemented as a trusted device. As shown by a decision block 206, if the device is a discrete device (answer YES), the logic proceeds to a block 208 in which TDX IO Provisioning Agent 114 sets up the link encryption between PCIe RP 136 and the device (to be used by secure PCIe link 140). If the device is embedded on the processor/SoC (such as an on-board accelerator), block 208 is bypassed.

In a block 210 VMM 106 spawns a dTD (e.g., dTD 112) and direct-assigns a device (e.g., device/accelerator 104) for which the dTD image either contains the device driver and firmware extensions, or the firmware extensions may be onloaded from the device into the dTD. For example, FIG. 1 depicts firmware 126 being onloaded from firmware 133 on device/accelerator 104. In one embodiment, firmware 126 comprises ring-0 macrocode.

In a block 212, the dTD verifies the underlying hardware device interface binding via SEAMCALL APIs as defined for TDX IO. For example, as shown in message 3a in FIG. 1, dTD 112 validates the identity of device/accelerator 104 through use of a certificate and device measurements 140. In one embodiment, the certificate comprises a certificate chain that can be verified starting from a certificate chain provisioned into the TPA. In some embodiments the measurements are hashes of the firmware (code and data) signed with a private key that the device holds. After the certificate chain is verified, the dTD does a nonce-based challenge response with the device, and the device responds to the challenge with a signature on the nonce and the measurement hashes. The certificate establishes that the device is the holder of the private key.

In a block 214, the dTD backend exposes a virtual composed device to legacy VMs or TDs via the VMM. For example, as depicted by interface 4 in FIG. 1, dTD backend 124 exposes a virtual composed device corresponding to bound device/accelerator 104 to VM or TD 111.

In a block 216, a VM or TD that uses the dTD composed device proceeds through a similar interface binding and verification protocol to verify the attestation information (e.g., measurement) of the composed device. As illustrated by a message 3b in FIG. 1, in one embodiment a certificate 142 is used by the verification protocol to verify the measurements.

In a block 218, the remote cloud tenant that requires the composed device verifies the measurements of the TD (using applicable TD attestation mechanisms) and the composed device before it provisions the workload that uses the composed device. Various trust models may be used for communication between the TD and the remote cloud tenant, with the particular trust model that is used being outside the scope of this disclosure.

The process is completed in a block 220 in which the TD starts using device front-end interface 122 for control-path interactions with the composed device, while the data path interactions with the underlying hardware continue via secure PCIe link 140. Optionally, other types of transport links may be used, such as but not limited to CXL links.

Figure 3:
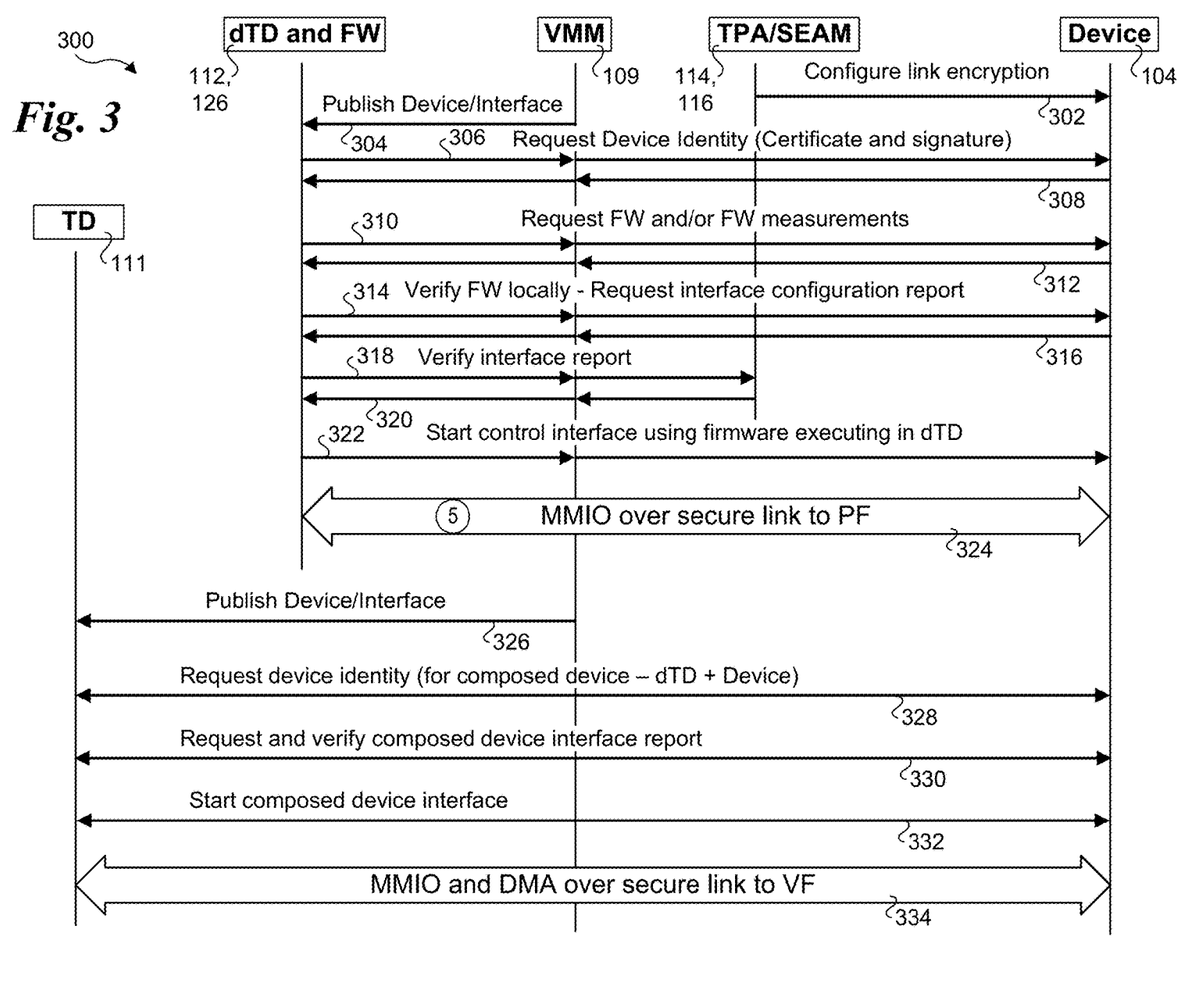
FIG. 3 is a message flow diagram for configuring and operating the architecture in FIG. 1 according to one embodiment.

FIG. 3 shows a message flow diagram 300 for configuring and operating architecture 100, according to one embodiment. The message flow begins with a message 302 sent from TPA/SEAM 114, 116 to device 104 to configure link encryption. VMM 106 then publishes a device/interface to be used for the composed trusted device, as shown by a message 304 sent to dTD 112. dTD 112 sends a message 306 requesting device identity (e.g., a certificate and signature) to device 104, which returns corresponding identity credentials via a message 308.

As depicted by a message 310, dTD 112 requests firmware and/or firmware measurements for device 104, which returns firmware and/or firmware measurements (as applicable), as depicted by a message 312. Next, dTD 112 verifies the firmware locally and then sends a message 314 to request an interface configuration report from device 104, which returns the interface configuration report in a message 316. dTD 112 then verifies the interface report by sending an interface report verification request to TPA 116 via a message 318, which verifies the interface report and returns a verification response via a message 320.

As this point, the platform has authenticated the composed trusted device and configured interfaces for communicating with the dTD and composed trusted device. As shown by a message 322, dTD 112 starts the control interface on device 104 using firmware executing on the dTD. At this point, the dTD is bound to the device. Configuration of the device and/or obtaining device capabilities is then performed using MMIO and control register interface 132 to access control registers and other configuration information for device/accelerator 104, as depicted by bi-directional communication 324. In one embodiment, this communication employs (e.g. Security Attribute of Initiator (SAI)-based) access control over a secure link, as depicted by a secure link 5 in FIG. 1. In one embodiment the device includes one or more physical functions (PFs) that are accessed to determine functionality provided by the composed trusted device.

Once the device capabilities/configurations are known, the dTD can publish an abstracted interface to access those functions. The device capabilities and interface are published by the VMM, as depicted by a message 326 including information concerning the device and abstracted interface that is sent from VMM 109 to TD 111.

Each of double-headed arrows 328, 330 and 332 represent a message exchange between TD 111 and device 104. As depicted by double-headed arrow 328, TD 111 requests device identity for the composed device, which includes an identity of the dTD plus an identity of the composed device. TD 111 also requests and verifies the composed device interface report, as depicted by double-headed arrow 330. Once the composed device interface report is verified, the composed device interface is started, as depicted by double-headed arrow 332. At this point, TD 111 can access the functionality of the physical device by using MMIO and DMA to access one or more virtual functions for the device, as depicted by bi-directional communication 334.

The onloaded firmware 126 can be used to perform control path configuration. For example, if the device is an accelerator, this may include setting up downstream FPGA bitstreams into the device and setting up the partitioning of the FPGA logic between the bitstreams. Control path configuration may also be implemented by setting up page tables and/or memory encryption in the device.

FIG. 4 shows one embodiment of a platform architecture 400 corresponding to a computing or host platform suitable for implementing aspects of the embodiments described herein. Generally, like-numbered components in architecture 100 of FIG. 1 and platform architecture 400 of FIG. 4 are similar and perform similar functions, noting similar does not mean identical (in some instances), and some components may differ between the embodiments. Accordingly, the following discussion is generally focused on additional components and functions not present in architecture 100.

Architecture 400 includes a hardware layer in the lower portion of the diagram including platform hardware 401, and a software layer that includes software components running in system memory 403 including a host operating system 108. Platform hardware 401 includes a processor 402 having a System on a Chip (SoC) architecture including a central processing unit (CPU) 408 with M processor cores 410, each coupled to a Level 1 and Level 2 (L1/L2) cache 412. Each of the processor cores and L1/L2 caches are connected to an interconnect 414 to which each of a memory interface 416 and a Last Level Cache (LLC) 418 is coupled, forming a coherent memory domain. Memory interface 416 is used to access host memory 403 in which various software components are loaded and run via execution of associated software instructions on processor cores 410.

Processor 402 further includes an IOMMU 138 and an IO interconnect hierarchy, which includes one or more levels of interconnect circuitry and interfaces that are collectively depicted as IO interconnect & interfaces 420 for simplicity. In one embodiment, the IO interconnect hierarchy includes a PCIe root controller and one or more PCIe root ports having PCIe interfaces and operated as a PCIe endpoint, including PCIe RP 136. Various components and peripheral devices are coupled to processor 402 via respective interfaces (not all separately shown), including a device 404, a firmware storage device 422 in which firmware 424 is stored, and a disk drive or solid state disk (SSD) with controller 426 in which software components 428 are stored. Optionally, all or a portion of the software components used to implement the software aspects of embodiments herein may be loaded over a network (not shown) accessed, e.g., by a network interface (not shown). In one embodiment, firmware 424 comprises a BIOS (Basic Input Output System) portion and additional firmware components configured in accordance with the Universal Extensible Firmware Interface (UEFI) architecture.

During platform initialization, various portions of firmware 424 (not separately shown) are loaded into host memory 403, along with various software components. In addition to host operating system 108 the software components include the software components shown in architecture 100 of FIG. 1 (as identified by the same reference numbers in FIGS. 1 and 4). Moreover, other software components may be implemented, such as various components or modules associated with a VMM or hypervisor, VMs, and applications running on a VM or TD. Generally, a host platform may host multiple VMs and/or TDs, including a mix of VMs and TDs, some of which may be in a TDX trusted address space and other not in a TDX trusted address space.

In the illustrated embodiment, device 404 comprises an accelerator including one or more FPGAs 430 configured to implement one or more functions such as encryption, decryption, compression, decompression, and/or other functions that may be implemented on an accelerator. Device 404 also includes one or more virtual functions 435 and provides associated interfaces to enable device 404 to implement fast-path communication with software components in system memory 403. In one embodiment device 404 may be implemented as a para-virtualized IO device that supports fast-path communication using DMA and a virtual data path passing through dTD 112 and using a physical function 434.

In some embodiments device 404 may include circuitry comprising various types of embedded logic implemented with fixed or programmed circuitry, such as application specific integrated circuits (ASICs), FPGAs, PLDs, and/or CPLDs. Optionally, or in addition, device 404 may implement various functionality via execution of firmware 436 or otherwise embedded instructions on a processor 438 coupled to memory 440. In some embodiments, one or more regions of memory 440 may be configured as MMIO memory.

Generally, control register interface 132 provides an interface to registers 442, which may be mapped as MMIO and be read and/or written to using MMIO reads and writes origination from dTD 112 and or TPA 114. Other software components, including VMM 109 is some embodiments, may also access registers 442 using MMIO access provided by control register interface 132.

While platform architecture 400 shows a single device 404, this is merely exemplary and non-limiting. A given compute platform may include multiple devices, some or all of which may be implemented as composed trusted devices that are bound to one or more dTDs on the platform. Under one embodiment, a single dTD may be implemented to provide secure access to multiple composed trusted devices, while in other embodiments multiple dTDs may be employed for accessing multiple composed trusted devices.

The use of "TDX" and associated nomenclature in the text and drawings is exemplary and non-limiting. Similar approaches may be employ using non-Intel® processors, such as TRUSTZONE™ for ARM®-based processors including but not limited to processors made by AMD®. Other non-limiting secure and/or trusted technologies include AMD® Secure Memory Encryption and AMD® Secure Encrypted Virtualization. Generally, a secure or trusted technology that is used to isolate execution of software and/or firmware in a trusted memory space may be implemented in a similar manner to the TDX associated components described and illustrated herein.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other. Additionally, "communicatively coupled" means that two or more elements that may or may not be in direct contact with each other, are enabled to communicate with each other. For example, if component A is connected to component B, which in turn is connected to component C, component A may be communicatively coupled to component C using component B as an intermediary component.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Italicized letters, such as 'n', 'M', etc. in the foregoing detailed description are used to depict an integer number, and the use of a particular letter is not limited to particular embodiments. Moreover, the same letter may be used in separate claims to represent separate integer numbers, or different letters may be used. In addition, use of a particular letter in the detailed description may or may not match the letter used in a claim that pertains to the same subject matter in the detailed description.

As discussed above, various aspects of the embodiments herein may be facilitated by corresponding software and/or firmware components and applications, such as software and/or firmware executed by an embedded processor or the like. Thus, embodiments of this invention may be used as or to support a software program, software modules, firmware, and/or distributed software executed upon some form of processor, processing core or embedded logic a virtual machine running on a processor or core or otherwise implemented or realized upon or within a non-transitory computer-readable or machine-readable storage medium. A non-transitory computer-readable or machine-readable storage medium includes any mechanism for storing or transmitting information in a form readable by a machine (e.g., a computer). For example, a non-transitory computer-readable or machine-readable storage medium includes any mechanism that provides (i.e., stores and/or transmits) information in a form accessible by a computer or computing machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A non-transitory computer-readable or machine-readable storage medium may also include a storage or database from which content can be downloaded. The non-transitory computer-readable or machine-readable storage medium may also include a device or product having content stored thereon at a time of sale or delivery. Thus, delivering a device with stored content, or offering content for download over a communication medium may be understood as providing an article of manufacture comprising a non-transitory computer-readable or machine-readable storage medium with such content described herein.

The operations and functions performed by various components described herein may be implemented by software running on a processing element, via embedded hardware or the like, or any combination of hardware and software. Such components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration information, etc.) may be provided via an article of manufacture including non-transitory computer-readable or machine-readable storage medium, which provides content that represents instructions that can be executed. The content may result in a computer performing various functions/operations described herein.

As used herein, a list of items joined by the term "at least one of" can mean any combination of the listed terms. For example, the phrase "at least one of A, B or C" can mean A; B; C; A and B; A and C; B and C; or A, B and C.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method implemented on a compute platform including one or more devices, a processor, memory, and having a set of hardware, firmware, and software components associated with a trusted computing base (TCB), the software components including a host operating system (OS) and a virtual machine monitor (VMM) that are loaded and executed in a first portion of an address space of the memory employed by the TCB, the method comprising:
   implementing a device trust domain (dTD) in a trusted address space comprising a second portion of the memory address space that is separate from the first portion of the memory address space employed by the TCB;
   binding a first of the one or more devices to the dTD; and
   enabling one or more virtual machines (VMs) or trusted domains (TDs) to access one or more functions provided by the first device bound to the dTD.

2. The method of claim 1, further comprising:
   onloading firmware stored on the first device to the dTD; and
   executing the firmware that is onloaded to the dTD to enable access to one or more functions provided by the first device.

3. The method of claim 1, further comprising:
   exposing, via an interface on the dTD, the first device as a virtual composed device; and
   enabling a VM or TD to access the virtual composed device via the interface on the dTD.

4. The method of claim 3, further comprising:
   generating attestation information for the virtual composed device;
   accessing, by a VM or TD via the interface on the dTD, the attestation information; and
   verifying, by the VM or TD through the attestation information, the virtual composed device is a trusted device in a trusted address space.

5. The method of claim 4, further comprising:
   sending the attestation information to a remote cloud tenant to enable the remote cloud tenant to verify the virtual composed device is a trusted device; and
   receiving a workload to be processed using one or more functions provided by the first device.

6. The method of claim 1, wherein the first device is coupled to the processor via an input-output (IO) link, further comprising:
   setting up link encryption for communication between the first device and the processor over the IO link to set up a secure IO link; and
   configuring direct memory access (DMA) communication between the first device and a VM or TD, wherein the DMA communication employs the secure IO link.

7. The method of claim 1, wherein the trusted address space is a Trusted Domain Extension (TDX) trusted address space that may be accessed by executing TDX instructions on the processor.

8. The method of claim 1, further comprising:
   storing one or more certificates or secrets that are at least one of,
      a) associated with the first device; and
      b) employed to implement an encrypted communication link used to communicate with the first device, wherein the VMM cannot access the one or more certificates or secrets.

9. The method of claim 1, further comprising:
binding a second of the one or more devices to the dTD; and
enabling one or more virtual machines (VMs) or trusted domains (TDs) to access one or more functions provided by the second device bound to the dTD.

10. A non-transitory machine-readable storage medium having instructions stored thereon configured to be executed on a processor of a compute platform including memory, one or more devices, and a set of hardware, firmware, and software components associated with a trusted computing base (TCB), the software components including a host operating system (OS) and a virtual machine monitor (VMM) that are loaded and stored in a first portion of an address space of the memory employed by the TCB, wherein execution of the instructions enables the compute platform to:
implement a device trust domain (dTD) in a trusted address space comprising a second portion of the memory address space that is separate from the first portion of the memory address space employed by the TCB;
bind a first of the one or more devices to the dTD; and
enable one or more virtual machines (VMs) or trusted domains (TDs) to access one or more functions provided by the first device bound to the dTD.

11. The non-transitory machine-readable storage medium of claim 10, wherein execution of the instructions further enables the compute platform to:
onload firmware stored on the first device to the dTD; and
execute the firmware that is onloaded to the dTD to enable access to one or more functions provided by the first device.

12. The non-transitory machine-readable storage medium of claim 10, wherein execution of the instructions further enables the compute platform to:
expose, via an interface on the dTD, the first device as a virtual composed device; and
enable a VM or TD to access the virtual composed device via the interface on the dTD.

13. The non-transitory machine-readable storage medium of claim 11, wherein execution of the instructions further enables the compute platform to:
generate attestation information for the virtual composed device; and
provide the attestation information to a VM or TD via the interface on the dTD to enable the VM or TD to verify the virtual composed device is a trusted device.

14. The non-transitory machine-readable storage medium of claim 11, wherein the first device is coupled to the processor via a Peripheral Component Interconnect Express (PCIe) link, and wherein execution of the instructions further enables the compute platform to:
set up link encryption for communication between the first device and the processor over the PCIe link to set up a secure PCIe link; and
configure direct memory access (DMA) communication between the first device and a VM or TD, wherein the DMA communication employs the secure PCIe link.

15. The non-transitory machine-readable storage medium of claim 11, wherein execution of the instructions further enables the compute platform to:
bind a second of the one or more devices to the dTD; and
enable one or more virtual machines (VMs) or trusted domains (TDs) to access one or more functions provided by the second device bound to the dTD.

16. A compute platform, comprising:
a processor,
memory, coupled to the processor;
one or more devices, coupled to the processor;
a set of hardware, firmware, and first software components associated with a trusted computing base (TCB), the first software components including a host operating system (OS) and a virtual machine monitor (VMM) that are loaded and executed in a first portion of an address space of the memory employed by the TCB; and
second software components configured to be executed on the processor to enable the compute platform to:
implement a device trust domain (dTD) in a trusted address space that is separate from first portion of the address space employed by the TCB;
bind a first of the one or more devices to the dTD; and
enable one or more virtual machines (VMs) or trusted domains (TDs) to access one or more functions provided by the first device bound to the dTD.

17. The compute platform of claim 16, wherein execution of the second software components further enables the compute platform to:
onload firmware stored on the first device to the dTD; and
execute the firmware that is onloaded to the dTD to enable access to one or more functions provided by the first device.

18. The compute platform of claim 16, wherein execution of the second software components further enables the compute platform to:
expose, via an interface on the dTD, the first device as a virtual composed device; and
enable a VM or TD to access the virtual composed device via the interface on the dTD.

19. The compute platform of claim 16, wherein execution of the second software components further enables the compute platform to:
generate attestation information for the virtual composed device; and
provide the attestation information to a VM or TD via the interface on the dTD to enable the VM or TD to verify the virtual composed device is a trusted device.

20. The compute platform of claim 16, wherein execution of the second software components further enables the compute platform to:
bind a second of the one or more devices to the dTD; and
enable one or more virtual machines (VMs) or trusted domains (TDs) to access one or more functions provided by the second device bound to the dTD.

* * * * *